Figure 2A:
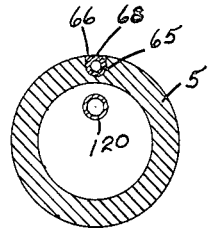

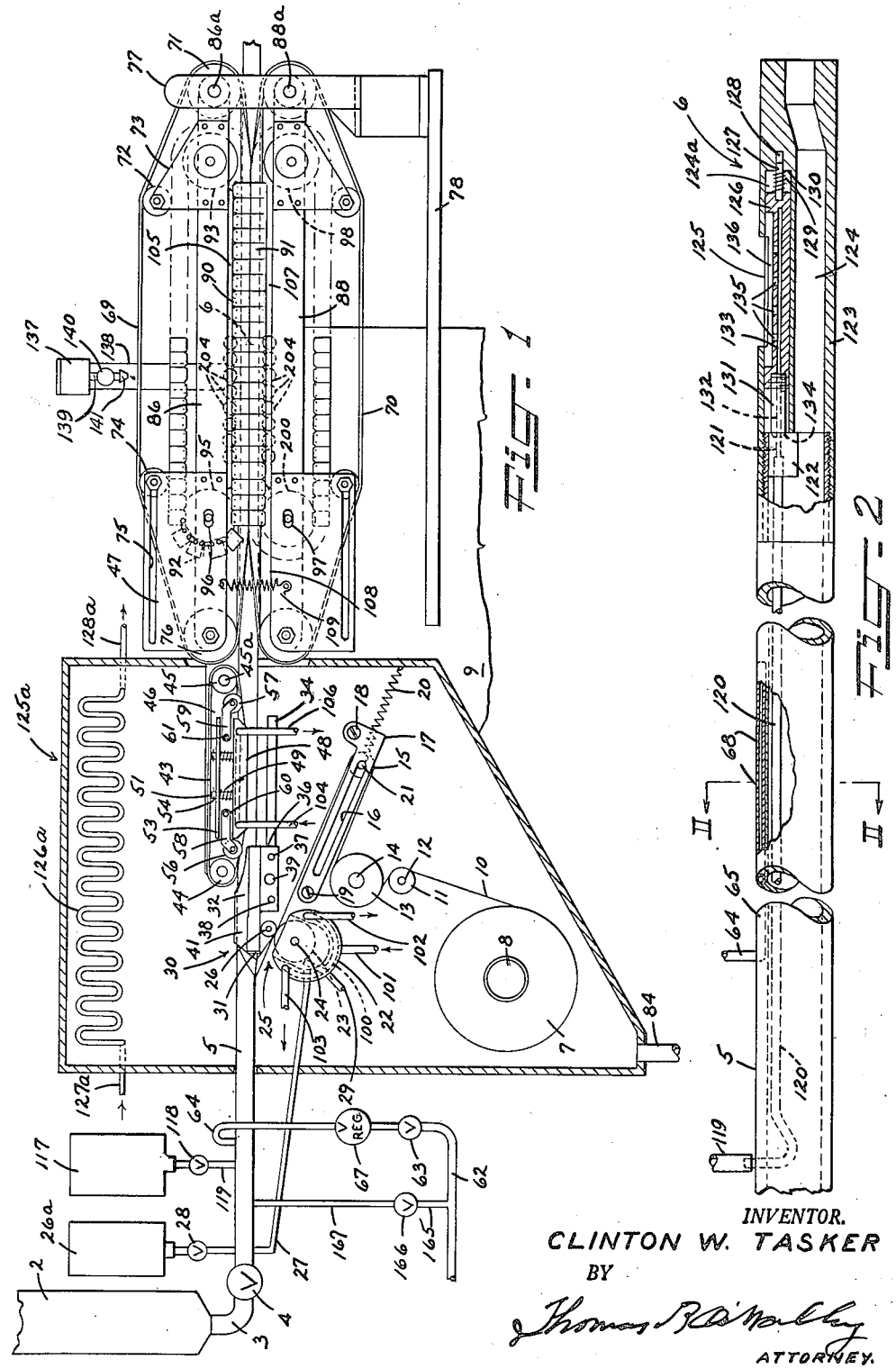

Oct. 16, 1956     C. W. TASKER     2,766,568
APPARATUS FOR PRODUCING TUBULAR ARTICLES
AND STUFFED PRODUCTS THEREFROM
Filed May 14, 1952     2 Sheets-Sheet 2

INVENTOR.
CLINTON W. TASKER
BY
Thomas B. O'Malley
ATTORNEY.

United States Patent Office 2,766,568
Patented Oct. 16, 1956

2,766,568

APPARATUS FOR PRODUCING TUBULAR ARTICLES AND STUFFED PRODUCTS THEREFROM

Clinton W. Tasker, Nether Providence Township, Delaware County, Pa., assignor to American Viscose Corporation, Philadelphia, Pa., a corporation of Delaware Application May 14, 1952, Serial No. 287,712

10 Claims. (Cl. 53—177)

This invention relates to apparatus for the production of tubes from continuous sheet material of indefinite length and especially to the production of stuffed products therefrom by stuffing the tube formed on the machine concurrently with the formation of the tube.

The primary object of the present invention is to provide an apparatus of the type mentioned hereinabove which is adapted to the production of tubes or stuffed tubular products by the use of a liquid solvent, adhesive, or cementing medium (hereinafter referred to as the "bonding liquid") which requires temperatures below room temperature for the development of the bond between the overlapped surfaces of the tube. Other objects and advantages of the invention will be apparent from the drawing and the description thereof hereinafter.

Figure 3A:
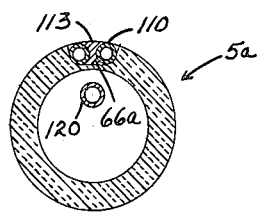
Figure 3:
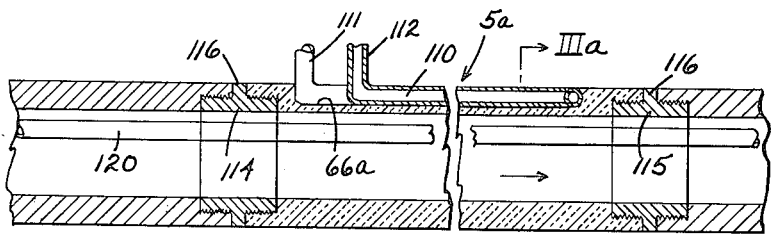
Figure 4:
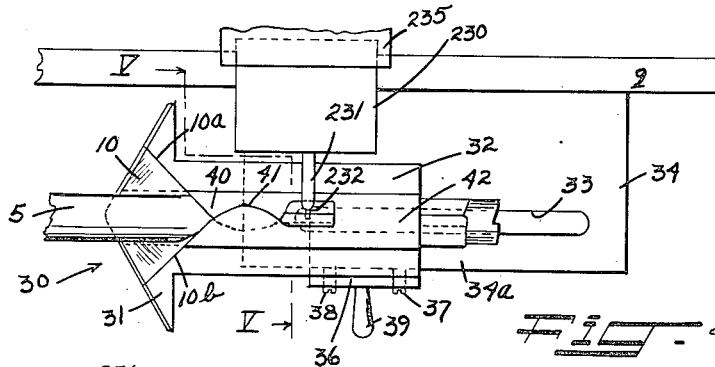
Figure 5:
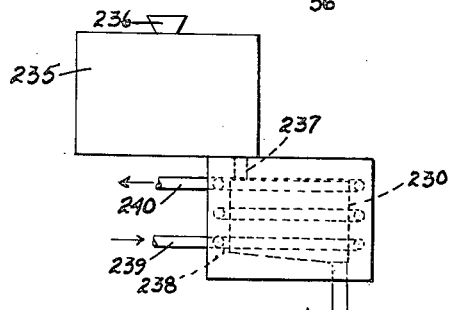

In the drawing, which is illustrative of the invention,

Figure 1 is a side elevation, with parts cut away, of one embodiment of the invention, Figure 2 is a side elevation, partly in section, of a suitable mandrel which may also be used as a conduit for stuffing material, Figure 2a is a cross-section taken on line II—II of Figure 2, Figure 3 is a sectional view of a portion of a modified mandrel, Figure 3a is a cross-section taken on line IIIa—IIIa of Figure 3, Figure 4 is a plan view of a modified liquid applying system therefor, and Figure 5 is a section taken substantially on line V—V of Figure 4.

While the apparatus of the present invention is particularly designed for the production of tubular products from ordinary cellophane, i. e., regenerated cellulose having a degree of polymerization of from 300 to 500, by means of cold aqueous alkali metal hydroxide solutions, such as sodium hydroxide, lithium hydroxide, and potassium hydroxide having a concentration of about 8 to 15% or of alkaline organic compounds, such as water-soluble amines and quaternary ammonium hydroxides such as trimethylammonium hydroxide in the form of aqueous solutions having concentrations within the range given for the alkali metal hydroxides hereinabove, the apparatus may also be used for adhering together the edges or any other parts of any alkali-sensitive sheet material which is adapted to be rendered adhesive by a cold alkaline solution and also for forming tubes from any sheet material by means of any other solvent or adhesive which is effective at lowered temperatures. An essential feature of the present invention is the provision of means for cooling the bonding liquid and/or means for cooling the portions of the sheet to be joined to appropriate temperatures below room temperature at or in advance of the position where the sheets are brought into contact by the apparatus. This cooling or refrigeration may extend beyond the point of juncture to whatever extent is necessary to set the bond to provide the strength of seal desired. It is one of the special advantages of the present apparatus that it can adhere sheet materials by means of adhesive or solvent media which at ordinary temperatures would either be completely ineffective or would require a long time for setting before the bonded tube could be subjected to stress. For example, at ordinary temperatures, caustic soda is incapable of forming any appreciable seal between layers of uncoated cellophane even after prolonged periods of contact. However, by refrigeration of the caustic soda solution in the apparatus of the present invention to temperatures in the range of —3° C. to —20° C., an extremely strong seal can be effected very rapidly within contact periods of about two or three seconds for the upper limit of temperature stated down to less than one second at the lower limit of temperature mentioned above. Also, when forming tubes from a sheet of water-insoluble, alkali-soluble cellulose ethers, such as hydroxyethyl cellulose, the rapidity of sealing is greatly increased over that at normal room temperature even when the refrigeration is much less severe than that required for cellophane. A marked increase in rapidity of seal is noticeable even when the material at the juncture is reduced only to a temperature of 10 to 15° C. Even more rapid sealing can be effected with these materials by further lowering the temperature to a point below 0° C.

Figures 1 to 3 show an embodiment in which the tube formed by the application of the bonding liquid between the overlapped edges of the sheet is concurrently stuffed. As shown in this embodiment, the sausage or other plastic material is forced under pressure, such as by air pressure, or by a screw feeding mechanism, or the like, from the storage tank 2 into the feed line 3, through the valve 4 into the hollow mandrel 5 which serves as an elongated feed line or conduit for the stuffing material, through the mandrel 5, and through the nozzle 6 which is attached to the end of the mandrel 5 (see Figure 2).

A roll of sheet material 7, for use in forming the casing, is rotatably mounted on the shaft 8 extending outwardly from the machine frame 9. The sheet material 10 passes under a guide roll 11 mounted on shaft 12 and then over a feed roll 13 mounted on shaft 14 which may be positively driven. The sheet material then passes around the tension roller 15 which is slidably mounted in the slot 16 in the bracket 17 which is in turn attached to machine frame 9 by bolts 18 and 19. There is, of course, a similar bracket, in which the other side of roller 15 is mounted, next to the machine frame and attached thereto by bolts 18 and 19. The sheet material, as it passes around roller 15, acts against the tension spring 20 which is attached between the machine frame 9 and shaft 21 on which roller 15 is mounted.

The sheet material 10 then passes the bonding liquid applicator which in the illustrative embodiment shown in Figure 1 comprises a tank or container 22 having a roller 23 mounted therein on shaft 24 which is in turn mounted on the machine frame 9. The container 22 may be jacketed as shown and hollow interior 100 of the jacket is provided with a refrigerating medium which may be supplied by the inlet conduit 101 and discharged by one or two conduits, such as 102 and 103 shown. The extent of refrigeration may be controlled by varying the temperature of the brine or other cooling medium or by varying the rate of flow of the brine through the jacket 100. This refrigeration system cools the liquid content of the tank to the temperature desired so that when applied to one end of the sheet by the roll 23, it immediately renders the sheet tacky, such as by its solvent action thereon. The container 22 has an opening therein through which the roller 23 protrudes, as shown at 25. The sheet material passes between the roller 23 and the pressure roller 26 which is mounted beneath the folding device 30 which is slidable on a bracket 34 secured to the frame 9 as explained hereinafter. Roller 23 is positioned in such manner that it contacts the sheet material 10 adjacent one edge thereof. Roller 23 is approximately half submerged in the bonding liquid in container 22 and upon being rotated by the passage of the sheet material thereover, the bonding liquid is transferred to the edge of the sheet. Any other comparable type of liquid applicator may be employed if so desired, for example, a brush and fountain device may be employed.

The bonding liquid is stored in the tank 26a and is fed by gravity, or a pump, etc. if desired, through the conduit or pipe 27 which may be made from any material which is resistant to the particular bonding liquid which, as stated, may be caustic soda. Saran tubing is satisfactory and in addition is flexible. A valve 28 is positioned in the line 27 so that the supply may be turned on and off when desired. An overflow pipe 29 is connected to the container 22. The excess adhesive material in container 22 runs through the overflow pipe to a pump and conduit (not shown) and is returned to tank 26a.

After the bonding liquid has been applied to the sheet, the latter passes to the tube-former or casing-former 30. The sheet first passes over the approximately V-shaped spreader guide 31 which is integrally attached to the base 32 which carries the tube-former. As shown in Figure 4, the base 32 by and under which the roll 26 is carried may be slidably mounted in the slot 33 in the bracket 34 which extends outwardly from machine frame 9. The base 32 is mounted in slot 33 by a U-shaped "keel" portion having one side of the U extending downwardly from the base 32 through slot 33, the bottom of the U extending under the outer portion 34a of the bracket 34 (Figure 4) and the other side of the U having a portion 36 extending upwardly in front of the outer face of the bracket 34. The tube-former is held in place by means of the set screws 37 and 38 which extend through the portion 36 against the outer face of bracket 34. Also attached to the portion 36 of the tube-former 30 is a handle 39 to facilitate the manual moving of the tube-former 30 and roll 26 along the slot 33 when the set screws 37 and 38 are loosened. Due to the sharp angle formed when the sheet material passes over the spreader guide 31, the tube-former and guide is moved to the right of the position shown in Figure 1 when the machine is being threaded, and then pushed back to the position shown for normal operation. This adjustable feature also enables one to put any desired pressure on the sheet material by the spreader guide depending upon the tendency of the sheet material to fold or wrinkle and the amount of spreading action needed to overcome such tendencies.

The mandrel 5 fits in the sleeve-like body of the tube-former but with sufficient clearance to allow the passage of the sheet material therebetween. The film or sheet 10 passes over the spreader guide 31 and under the mandrel 5. Edge 10a of the sheet (Fig. 4) passes under the curved tongue-like member 40 against the mandrel 5. The edge 10b, along which the bonding liquid has been placed, passes under the tongue-like member 41 which overlaps the member 40 but is a sufficient distance from the same to keep the bonding liquid from being rubbed off the sheet material by member 40. After edge 10a passes from under the member 40, the edges are free to come into contact with each other and they pass in overlapped relation under the final closed portion 42 of the sleeve-like tube-former 30. The sheet is now in the shape of a tube or casing conforming in size to the mandrel 5 and wrapped thereabout and the edges 10a and 10b are in bonded relationship.

After passing from the tube-former, the tube passes under the belt 43 which is driven by pulleys 44 and 45 and presses the overlapped edges against the top of the mandrel 5. The pulleys are mounted on the bracket 46 which is attached to and projects from the bracket 47. The belt 43 is held tightly against the casing on the mandrel 5 by means of the curved metal shoe 48 which in turn is held down by the compression springs. The shoe 48 is provided with a hollow interior which may be supplied with any cooling medium such as a brine by means of one or more inlet pipes 104 extending into one or both sides of the shoe and it may escape by means of the pipe 106 extending from the top of the shoe. The springs 49 are wrapped about the posts 51 which extend upwardly from the plate 48 through the plate 53 which is attached to and extends outwardly from bracket 46. The springs are positioned between the curved shoe 48 and the plate or bracket 53. To limit movement of the shoe downwardly by the compression springs when this belt assemblage is lifted off the mandrel, cotterpins 54 are passed through the top of posts 51.

In order to prevent the belt from wearing as it passes under the shoe 48 and out from under the same, arcuate or grooved rollers 56 and 57 may be positioned adjacent each end of the shoe 48 and conform to the conduit 5. The rollers 56 and 57 are mounted on brackets 58 and 59 respectively which in turn are mounted on posts 60 and 61 attached to the bracket 46. The rollers serve to lead the belt under the plate and lead it away from the same to prevent undue friction between the belt and leading and trailing edges of the plate.

Optionally, air pressure may be employed to press the casing against the belt. The air is conducted to the mandrel 5 through the line 62, through valve 63 into the smaller pipe line 64 which in turn is connected to the small pipe or tube 65 seated in the grooved recess 66 in the top wall of the mandrel 5 (see Figure 2a). A pressure regulating valve 67 is inserted in the line 64. The tube 65 extends under the belt 43 and that portion of the tube 65 under the belt has small openings 68 cut therein to allow the air to escape and press the casing seam, which is directly above the openings, against the belt. However, the system comprising elements 64, 65, and 68 is not necessary to produce a good seal.

The pipe 64, when the system 65, 68 is used, may be connected to a source of cold air or a source of air which is under sufficient compression that, when it expands upon escaping from the openings 68, it will cool the immediate vicinity to the desired extent. This, in effect, cools the overlapped juncture of the edges of the sheet and presses the juncture or seal of the tube upwardly against the shoe 48 which, as stated above, may be refrigerated as well.

When the adhesive material employed in forming the casing contains a strong alkali, it is desirable in many cases to neutralize the excess alkali present on the casing seam in order to guard against any possible injurious effects in the finished product. For this purpose the seam may be brought into contact with an aqueous solution of an acid which when reacted with an alkali, such as sodium hydroxide, will form a non-injurious salt therewith. It is preferred to employ an aqueous solution of acetic acid, but any other similar acid may be employed if desired, such as citric, tartaric, etc.

Referring to Figures 1 and 2, the acetic or other acid is brought in contact with the casing seam as follows: the aqueous acid solution is stored in a tank 117 and flows therefrom through the valve 118 and line 119 which is connected to the small bore pipe line 120 in conduit 5. The line 120 is positioned in the upper part of conduit or sausage feed line 5 (see Figure 2). However, the line 120 may be formed as a bore in the wall of conduit 5 if desired. The line 120 terminates in the block 122 in the end of conduit 5 and communicates with the bore 121 through the block 122.

In Fig. 2, the nozzle 6, which is screwed onto the end of conduit 5, comprises a pipe or conduit 123 having a bore 124 therein for the passage of sausage or like material therethrough, the bore 124 being aligned with the opening in the end of conduit 5. The conduit 123 has a longitudinally extending bore 124a in the upper portion thereof and an elongated slot or opening 125 in the top of conduit 123 communicates with the bore 124a. The sealed edges of the casing passes over the opening 125. Into the opening 124a, there is inserted the block 126 before the nozzle 6 is screwed onto conduit 5. Attached to the leading end of block 126 is a peg or pin 127 which, when the block is inserted into the opening 124, fits into the hole 128 in the conduit 123. A compression spring 129 is placed over the peg 127 before insertion into opening 124 so that it abuts against the face or wall 130 of conduit 123. The trailing end of block 126 has a nipple or adaptor 131 screwed therein. The nipple has a small bore 132 therein which corresponds in size to the small bore 121 in the block 122 and connects the same with the small bore 133 in the block 126. When the conduit 123 or nozzle 6 is screwed onto conduit 5, the nipple 131 seats in the block 122 as shown at 134 and is held tightly therein by the action of the compression spring 129. The portion of the block 126 above the bore 133 has small openings 135 cut therein which connect the bore 133 with the chamber or reservoir 136 in the upper part of the block 126. The slot 125 in the casing 123 opens into the chamber 136.

Thus, the acetic acid in tank 117 is fed by gravity or pumped if desired through line 119, line 120, through the bore 121, nipple 131, bore 133, through the openings 135 into the reservoir 136 where it comes in contact with the underside of the casing seam as the same passes over the opening 125. If desired, the reservoir or chamber 136 may be packed with an absorbent material such as sponge, cotton, etc. The valve 118 and the packing of the chamber 136 serve as means to regulate the flow of acid through the opening 125.

In order to deposit acetic acid or the like on the top surface of the casing seam, there is employed a container 137 positioned above the upper belt 69 on the bracket 138 which in turn is fastened to one of bars 86, such as the back bar 86. The acid passes from the container 137 through the line 139, valve 140 and nozzle 141 onto the belt 69 which in turn carries the acid into contact with the upper surface of the casing seam. The valve 140 provides a means of regulating the amount of acid transferred to the belt 69. If desired, the means for putting acid on the top of the casing seam may be eliminated since the acid applied to the underside of the seam may be sufficient if the same penetrates the casing seam rapidly enough.

The now-formed casing or tube passes along the mandrel 5 until it comes into contact with the feeding and molding system comprising the feed belts 69 and 70. Belt 69 is driven by pulley 71 and travels from 71 over the guide pulley 72 mounted between a pair of brackets 73, over pulley 74, which is adjustably mounted in the slots 75 in a pair of brackets 47, around pulley 76, along the mandrel 5 and nozzle 6 and then back to pulley 71. Pulley 71 is mounted on and between the pair of upright brackets 77 which in turn are mounted on the supporting member or bracket 78 attached to machine frame 9. By moving the pulley 74 to the left, as viewed in Figure 1, the belt 69 may be tightened which may be necessary after considerable use. Belt 70 is analogously mounted and driven as shown.

A pair of parallel horizontal bars or strips 86 extend from the shaft 86a on which the bars are pivotally swingable. Each bar 86 carries rigidly secured thereon one of the brackets 73, one of the brackets 47 and the bar 105, the rolls 72, 74, 93 and 95 providing with their shafts a suitable rigid interconnection between the parallel bracket system. The pair of bars 88 is pivotally mounted on shaft 88a and is connected to the corresponding brackets of the lower system in a manner similar to the connections of 86 to the upper system. A spring 108 connected at its upper end to one of brackets 47 is adapted to be hooked around the pin 109 on a lower bracket fixed on bar 88 and serves when so hooked to urge the upper and lower sections of the feeding and molding system together in the position shown.

The belts 69 and 70, in addition to their feeding action also help to hold the casing tightly about the mandrel 5 and nozzle 6 and also help to maintain the desired shape of the stuffed product after it passes beyond the end of nozzle 6. In order to hold the belts around the conduit and nozzle and then around the stuffed sausage, there is provided two chains of blocks 90 and 91 arranged in endless belt-like fashion and held together by the links 92. The opposed faces of the blocks are arcuate in shape or grooved out so that they fit approximately half-way around the mandrel or conduit 5 and nozzle 6 and conform to the size of the finished product. The blocks 90 are arranged in belt-like fashion around the pulleys 93 and 95. The pulley 95 is adjustable along slots 96 in order to loosen or tighten the belt or blocks as desired. The blocks 91 are likewise arranged in belt-like fashion around the pulleys 98 and 200 the latter of which is similarly mounted adjustably along slots 97.

In order to hold the blocks 90 and 91 close together and to keep them from separating due to the pressure of the sausage emerging from nozzle 6, the blocks have grooves cut in their back faces which acts as a track for the wheels 204 over which the blocks ride. The upper set of wheels 204 are mounted between spaced bars 105 attached to the bottom of the supporting frame 86 and the lower set of rolls 204 are mounted between bars 107 attached to the top of supporting frame 88.

As shown in Figure 1, an enclosure or housing 125a may be disposed around the portion of the apparatus where formation and sealing of the tube is effected. This housing is shown in section in Figure 1 and may have a door on the side of the machine closest to the observer when viewed from the same direction as in Figure 1. This housing may serve merely to maintain a moderated temperature between the temperature of the outside atmosphere and the temperature of refrigeration at the points designated hereinabove. However, it may also be refrigerated as by the coil 126a which may be fed with brine by the inlet conduit 127a extending along the back of the housing. The brine may be discharged to the back into conduit 128a. Preferably, the individual coils or loops of the coil 126a extend upwardly as they project from the back wall of the housing so that any condensation formed will run down along the coils to the frame panel 9 and drain to the bottom of the housing and out the drain 84. The provision of this housing and the coil 126a is not necessary in all cases but may be preferred for certain operations requiring an extremely low temperature.

The extent of refrigeration at any one of the three points, 100, 48, or 68 or at any two or all of these points is controlled to give the desired strength of seal in the time interval required by the formed tube to pass through the refrigerated area or zone.

Figures 3 and 3a show a modification of the mandrel in which the air pipe 65 is replaced by a pipe 110 which does not have perforations like 68 in pipe 65. This pipe 110 is in the form of a single return loop with the entrance at 111 and discharge at 112. Instead of supplying air to such a pipe, it may be supplied with a refrigerated brine and the space around the pipe 110 within the recess or groove 66a may be filled with a heat-conductive material as shown at 113. This provides a smooth outer periphery on the mandrel or conduit 5. The overlapped edges of the sheet to be joined is refrigerated as they pass over this section of the mandrel periphery.

Figure 3 also shows how the section of mandrel 5 which supports the refrigerating pipe 110 may be heat-insulated from the remainder of the mandrel. This may be done by suitable threaded couplings 114 and 115 spaced on each side of the section of the mandrel that is refrigerated. Preferably, the inside diameter of the couplings is flush with the inside diameter of the adjoining sections of conduit 5 so as to prevent the lodging and stagnation of any part of a stuffing material forced through the conduit. These couplings may be formed of hard rubber, synthetic resins, such as phenol-aldehyde resins, polyethylene, and the like and they may have projecting from their intermediate section, an annular ring or flange 116 adapted to be gripped by a wrench to facilitate dismantling and assembly. The use of this insulated segment or section of the mandrel 5 may be desirable when the material to be stuffed into the tube formed is sensitive to excessive lowering of temperature. The section of pipe between the couplings 114 and 115 designated 5a in Figure 2a may itself be formed of a heat-insulating material, such as hard rubber, a phenolaldehyde resin, or the like. If the stuffing material is fed through at a rapid rate, however, it is generally not necessary to provide such an insulated section. Similarly, when refrigerated products, such as preliminarily cooled ice cream still in a plastic condition, are being packaged, however, the insulating section is generally not necessary.

Figures 4 and 5 show a modification in which the liquid-applying tank 22 is omitted and instead a cold bonding liquid is fed from the container 230 through a conduit 231 and a wick 232 in the open end thereof under the upper of the two overlapped edges immediately after they leave the tongues 40 and 41 and immediately prior to their entrance into the closed cylindrical zone 42 of the forming sleeve. The bonding liquid may be contained in a reservoir 235 which is provided with a vent 236 and is connected by a conduit 237 with the tank 230. A cooling coil 238 may be provided with a refrigerating brine by means of the inlet pipe 239 and a discharge pipe 240. This system of supplying refrigerated bonding liquid to the space between the overlapped edges may be used in conjunction with the refrigerated shoe 48 and the refrigerated mandrel system either of Figure 2 or of Figure 3. As in the previous embodiments, a rapid and strong seal is obtained.

The apparatus of the present invention may be used to form stuffed products having any suitable cross-section, such as cylindrical, square, rectangular and so forth merely by suitably shaping the discharge end of the nozzle 6 and the cooperating surfaces of molding blocks 90 and 91.

It should be noted that the sheet or web of casing material may contain reinforcing fibers. For example, a multiplicity of loose natural or artificial short fibers may be dispersed in a solution of the alkali-soluble, water-insoluble cellulose material and the solution formed into a web. Alternatively, a thin tissue paper formed of natural or artificial fibers may be impregnated and coated with a solution of the alkali-soluble, water-insoluble cellulosic material which is coagulated by treatment with an acid, washed and dried. The presence of the loose fibers or of the tissue paper does not interfere with the sealing of the sheet material by the alkaline adhesive. The coatings containing fibers are stronger, less expansible and more opaque. Therefore, such fibrous casings are especially adapted for liver sausage and the like.

While for the most part, for purposes of description, reference has been made to the preparation of sausage, it is to be understood that the invention is not limited to such stuffed products but is equally advantageous for the continuous production of encased stuffed products of plastic nature, such as ice cream, fats, scrapple and other meat products, as well as cheese, lard, oleomargarine, greases, snuff, caulking compound, and other products normally stuffed into casings, and in the appended claims, the expression "stuffed products" is intended to include all such products.

The present apparatus has numerous advantages in the production of both frankfurters and large size sausages, it being understood, of course, that the sausage feed line and nozzle and the various parts fitting thereabout, may be varied in size and cross-sectional shape depending upon the size and shape of the finished stuffed product desired. The size of the sheet material used for forming the casing would be varied accordingly. The apparatus provides for continuous production which results in substantial economies in manufacture, reduces labor requirements, and increases the output per machine. As the casings are always uniform in diameter the product is more uniform than when the individual casings are stuffed according to prior practice.

It is to be understood that the foregoing description is merely illustrative and that changes and variations may be made without departing from the spirit and scope of the invention as defined in the appended claims.

I claim:

1. Apparatus for forming a tubular product from a continuous sheet comprising a mandrel, a sleeve-like forming member extending about the mandrel for shaping the sheet about the mandrel and overlapping the edges of the sheet, means for applying a liquid to at least one of the edges, cooling means positioned in the mandrel wall portion adjacent the path of the overlapped edges over the mandrel to cool the overlapped edges, and means for exerting pressure on the overlapped edges.

2. Apparatus for producing stuffed products comprising a hollow mandrel terminating in a nozzle, means for supplying the mandrel with a stuffing material, a source of supply for a continuous sheet material, a sleeve-like forming member extending about the mandrel for shaping the sheet about the mandrel and overlapping the edges of the sheet, means for applying a liquid to at least one of the edges, cooling means positioned in the mandrel wall portion adjacent the path of the overlapped edges over the mandrel to cool the overlapped edges, means for exerting pressure on the overlapped edges, and molding means around the nozzle and extending beyond the nozzle for controlling the shape of the stuffed product discharged from the nozzle.

3. Apparatus for forming a tubular product from a continuous sheet comprising a mandrel, a sleeve-like forming member extending about the mandrel for shaping the sheet about the mandrel and overlapping the edges of the sheet, means for applying a liquid to at least one of the edges before the sheet enters the forming member, means for applying pressure to the overlapped edges to unite the edges, orifices in the mandrel periphery disposed adjacent the pressure exerting means, and duct means within the mandrel wall to supply refrigerated or compressed air to the orifices.

4. Apparatus for forming a tubular product from a continuous sheet comprising a mandrel, a sleeve-like forming member extending about the mandrel for shaping the sheet about the mandrel and overlapping the edges of the sheet, means for applying a liquid to at least one of the edges before the sheet enters the forming member, an arcuate shoe extending lengthwise of the mandrel for applying pressure to the overlapped edges, an endless belt extending between the shoe and the mandrel, means for driving the belt so that its course adjacent the mandrel moves in the same direction as the formed tube, orifices in the mandrel periphery disposed adjacent the pressure exerting means, and duct means within the mandrel wall to supply refrigerated or compressed air to the orifices.

5. Apparatus for forming a tubular product from a continuous sheet comprising a mandrel, a sleeve-like forming member extending about the mandrel for shaping the sheet about the mandrel and overlapping the edges of the sheet, means for applying a liquid to at least one of the edges before the sheet enters the forming member, means for applying pressure to the overlapped edges to unite the edges, and a heat conductive duct for the passage of the cooling medium located in the wall of the mandrel adjacent the pressure applying means.

6. Apparatus for forming a tubular product from a continuous sheet comprising a mandrel, a sleeve-like forming member extending about the mandrel for shaping the sheet thereabout and overlapping the edges of the sheet, a liquid container positioned in front of the sleeve forming member, means for cooling the liquid in the container, means within the container for applying the cooled liquid to an edge of the sheet, means for applying pressure to the overlapped edges, orifices in the mandrel periphery adjacent the pressure applying means, and ducts to supply refrigerated or compressed air to the orifices.

7. Apparatus for forming a tubular product from a continuous sheet comprising a mandrel, a sleeve-like forming member extending about the mandrel for shaping the sheet thereabout and overlapping the edges of the sheet, a liquid container positioned in front of the sleeve forming member, means for cooling the liquid in the container, means within the container for applying the cooled liquid to an edge of the sheet, an arcuate shoe extending lengthwise of the mandrel for applying pressure to the overlapped edges, an endless belt extending between the shoe and the mandrel, means for driving the belt so that its course adjacent the mandrel moves in the same direction as the formed tube, orifices in the mandrel periphery adjacent the pressure applying means, and ducts to supply refrigerated or compressed air to the orifices.

8. Apparatus for forming a tubular product from a continuous sheet comprising a mandrel, a sleeve-like forming member extending about the mandrel for shaping the sheet thereabout and overlapping the edges of the sheet, a liquid container positioned in front of the sleeve forming member, means for cooling the liquid in the container, means within the container for applying the cooled liquid to an edge of the sheet, an arcuate shoe extending lengthwise of the mandrel for applying pressure to the overlapped edges, an endless belt extending between the shoe and the mandrel, means for driving the belt so that its course adjacent the mandrel moves in the same direction as the formed tube, means for cooling the shoe, orifices in the mandrel periphery adjacent the pressure applying means, and ducts to supply refrigerated or compressed air to the orifices.

9. Apparatus for producing stuffed products comprising a hollow mandrel terminated in a nozzle, means for supplying the mandrel with a stuffing material, a source of supply for a continuous sheet material, a sleeve-like forming member extending about the mandrel for shaping the sheet thereabout and overlapping the edges of the sheet, means for applying a liquid to at least one of the edges prior to the passing of the sheet to the forming member, cooling means for the sheet adjacent the sleeve forming member, an arcuate shoe extending lengthwise of the mandrel for applying pressure to the overlapped edges, an endless belt extending between the shoe and the mandrel, means for driving the belt so that its course adjacent the mandrel moves in the same direction as the formed tube, and means for cooling the shoe.

10. Apparatus for forming a tubular product from a continuous sheet by sealing together the edges of the sheet with a sealing liquid which is capable of forming a strong, durable and continuous seal between the sheet edges at lowered temperatures only comprising means for applying a sealing liquid which has sealing ability at lowered temperatures only to at least one of the sheet edges, a mandrel, a sleeve-like forming member extending about the mandrel for shaping the sheet and for overlapping the edges of the sheet after the low temperature sealing liquid has been applied to at least one edge of the continuous sheet, pressure applying means positioned adjacent and beyond the sleeve forming member for pressing together the overlapped sheet edges of the shaped sheet with the sealing liquid which is capable of forming a seal at lowered temperatures only applied to at least one of the sheet edges, and cooling means positioned adjacent the pressure applying means and cooperating therewith for cooling and maintaining the sealing liquid at a desired uniform lowered temperature while the overlapped sheet edges are being pressed together by the pressure applying means whereby the maximum sealing properties of the low temperature sealing liquid are obtained as the sheet edges are pressed together to provide a uniform continuous seal of good dry and wet strength.

References Cited in the file of this patent

UNITED STATES PATENTS

| | | |
|---|---|---|
| 1,607,846 | Potter | Nov. 23, 1926 |
| 1,654,871 | Gage et al. | Jan. 3, 1928 |
| 1,757,756 | Schwartz | May 6, 1930 |
| 1,792,388 | Neumiller | Feb. 10, 1931 |
| 1,872,898 | Cornock | Aug. 23, 1932 |
| 1,940,375 | Smith | Dec. 19, 1933 |
| 1,986,422 | Zwoyer | Jan. 1, 1935 |
| 2,006,376 | Vogt | July 2, 1935 |
| 2,008,271 | Zeigler | July 16, 1935 |
| 2,027,545 | Mapes | Jan. 14, 1936 |
| 2,142,505 | Gammeter | Jan. 3, 1939 |
| 2,178,922 | Smith | Nov. 7, 1939 |
| 2,217,591 | Kottman | Oct. 8, 1940 |
| 2,298,363 | Ganz | Oct. 13, 1942 |
| 2,419,982 | Zwoyer | May 6, 1947 |
| 2,484,780 | Clunan et al. | Oct. 11, 1949 |
| 2,607,696 | Kunz | Aug. 19, 1952 |